No. 700,625. Patented May 20, 1902.
J. DARLING.
AUTOMATIC CAR COUPLING.
(Application filed Jan. 10, 1901.)
(No Model.)
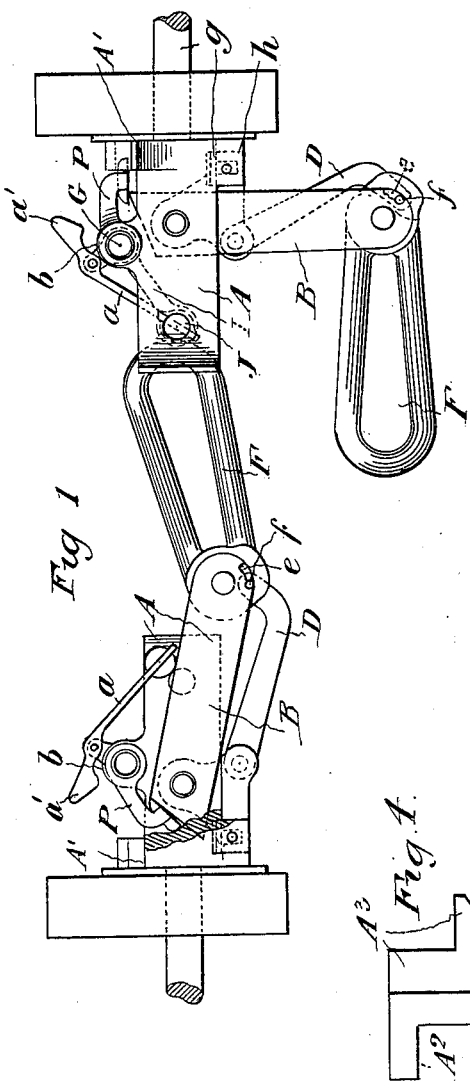
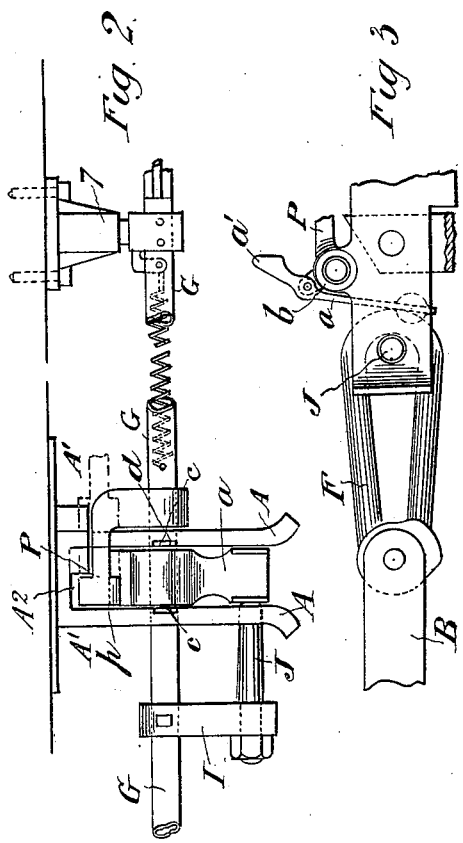

UNITED STATES PATENT OFFICE.

JOHN DARLING, OF RUTHERGLEN, SCOTLAND.

AUTOMATIC CAR-COUPLING.

SPECIFICATION forming part of Letters Patent No. 700,625, dated May 20, 1902.

Application filed January 10, 1901. Serial No. 42,793. (No model.)

*To all whom it may concern:*

Be it known that I, JOHN DARLING, engineer, of Gallowflat, Rutherglen, in the county of Lanark, Scotland, have invented new and useful Improvements in Automatic Car-Couplers, of which the following is a specification.

This invention relates to improvements in automatically coupling and uncoupling railway-carriages, wagons, and similar vehicles and is a further development of prior patent, No. 646,361, A. D. 1900.

In order that my invention may be more readily understood, I have appended one sheet of drawings, of which—

Figure 1 is a side elevation with details of same and showing two vehicles in act of coupling. Fig. 2 is a plan. Fig. 3 is a side elevation showing coupling effected. Fig. 4 is a view of back end of jaws. Fig. 5 is a view of pad or cushion.

In carrying out my invention in lieu of the spring-catch for releasing the coupling-pin J in automatically coupling two vehicles I provide a balanced pin-holder $a$, which is carried on a sleeve or collar $b$, loosely mounted on the cross-bar G. This balanced pin-holder $a$ is constructed so as in its normal position to close the openings provided in the side walls of the jaws A, (more particularly seen in Fig. 2,) and thus prevent the coupling-pin J from inadvertently passing in between them, and when two vehicles are to be coupled they are simply brought into contact with each other, when the front shackle or link F from its position passes in between the two jaws A and in so doing either raises the balanced pin-holder $a$ or presses it down, thereby releasing the coupling-pin J, which is connected to the cross-bar G by means of the bracket I, and so allows the pin to pass in between the jaws A and through the opening on the opposite side, and thus automatically couples the vehicles. When the coupling is effected by the shackle or front link F raising the balanced pin-holder $a$, the sleeve or collar $b$, loosely mounted on the cross-bar G, is turned a certain distance, which is determined by providing a recess or groove $c$ in the bearings of the cross-bar G and a cross-pin or catch $d$ on the loose collar or sleeve $c$, and when two vehicles are uncoupled, which is carried out in a manner similar to that described in the prior patent referred to, the balanced pin-holder $a$ returns to its normal position by its own weight, at the same time being prevented from falling over or beyond the openings in the walls of the jaws by the said recess or groove $c$ and cross-pin or catch $d$. If on coupling the balanced pin-holder $a$ is pressed down, it returns to its normal position by the action of a counterweight $a'$, arranged at the opposite end, so soon as the coupling-pin J is released. By arranging the balanced pin-holder $a$ with a double joint and back balance, whereby it can be raised or lowered, two wagons, although standing hard up against each other and the apparatus not in the coupling position, by simply operating either of the handles can be coupled.

In lieu of the telescopic lever-link D, referred to in the former patent, being hollow and spring-pressed I make the link solid, and I provide the end of the shackle F with a slot $e$, the two being connected together by means of a pin $f$. By the use of this slot the necessary looseness or play is given to allow the shackle or link F to yield when coming against the balanced pin-holder $a$ when coupling or against any other solid obstacle which might be in the way.

Referring to the means of locking the coupling-pin J after the coupling of the two wagons has been effected and also of locking it against coupling when required, according to the present invention I so construct the inner end A' of the jaws A that on one side there is a recessed portion $A^2$, while the other side is provided with a projecting lip or flange $A^3$. One end of the pawl P, described in the patent already referred to, is recessed for the purpose to be hereinafter described. The coupling-pin J in place of being rigidly fixed to the cross-bar G by means of the bracket I is carried loosely thereon, so that the latter can be slightly turned independently of the former. When two vehicles have been coupled together, the pawl P, by means of its own weight and that of the handles at end of cross-bar G, (not shown here,) falls behind the lip or flange $A^3$ on the inner end of the jaws A, and thus completely locks the coupling-pin J in the coupling position. When the vehicles are to be uncoupled, the handles are slightly turned, when the pawl P becomes disengaged from its hold on the jaws and the uncoupling effected in the manner described in the prior patent. In order to lock the coupling-pin J against coupling when not required, the recessed portion p at end of pawl P slips under the recess $A^2$ on other end of jaws and is held there until released. If necessary, in order to more securely hold the pawl P in the locking position, I may employ a suitable spring.

If necessary, to insure the links F and B, after being released from coupling-pin, falling into the required position for coupling again, I provide an india-rubber or other elastic pad g at back end of jaws, which is retained in position by a plate h. With these there can be no possibility of the links standing out straight when uncoupled and by which if anything were coming against them they might be broken.

In lieu of carrying the cross-bar G on the brackets 7, as described in my prior patent and also shown on the drawings herein, I may so construct the jaws that they themselves will be able to support the cross-bar without the aid of the brackets.

I claim—

1. In a car-coupler, the combination with the jaws having pin-openings formed through the walls thereof, and a pin under tension adapted to enter said openings, of a swinging member connected to the coupler, and a counterbalanced pin-holder pivoted to said member and normally depending between the jaws to close the openings in the walls thereof and to prevent the pin from moving to coupled position.

2. In a car-coupler, the combination with jaws having pin-openings formed therein, and a coupling-pin under tension adapted to enter said openings, of a cross-bar for operating the pin, a sleeve or collar having a limited movement on the cross-bar, and a counterbalanced pin-holder pivoted to the sleeve or collar and normally depending between the jaws to close the openings in the walls thereof, and to prevent the pin moving to coupled position.

3. In a car-coupling, the combination of the jaws having pin-openings therein and a recess, a coupling-pin under tension adapted to enter said openings, a cross-bar connected to the coupling-pin, a link pivoted between the jaws, a pin-link carried by the first link, and a pawl carried by the cross-bar to operate the pin-links and engaging within the recess of the jaws to lock the pin in its withdrawn position.

4. In a car-coupler, the combination with the jaws having pin-openings formed in the walls thereof, of a coupling-pin under tension entered in one of said openings, a counterbalanced pin-holder pivoted over and depending between said jaws to prevent the pin passing through the said openings into coupled position, the cross-bar G, the sleeve or collar loosely mounted on said cross-bar, said counterbalanced pin-holder being carried by said sleeve or collar, a bracket connecting the cross-bar and coupling-pin, a recess $A^2$ at the inner end of one of the jaws and a projecting lip or flange $A^3$ formed at the inner end of the other jaw, the pawl P pivoted to said cross-bars adapted to fall behind the lip or flange $A^3$ on the inner end of the jaws, thereby locking the coupling-pin in the coupled position.

In testimony whereof I affix my signature in the presence of two witnesses.

JOHN DARLING.

Witnesses:
JOHN LIDDLE,
EDITH MARY EDMONDSTONE.